Aug. 4, 1959  G. J. WASKO ET AL  2,898,542
PORTABLE GENERATOR UNIT
Filed Feb. 18, 1957  5 Sheets-Sheet 1
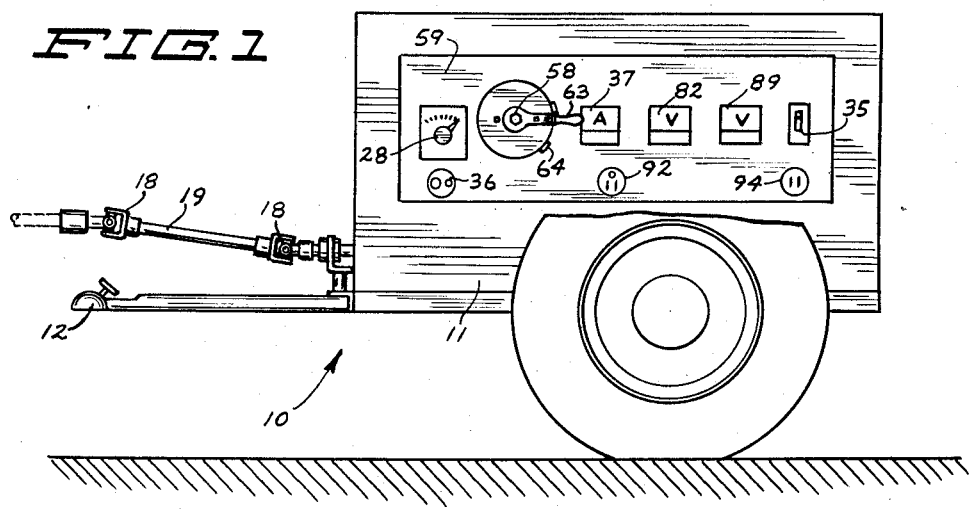
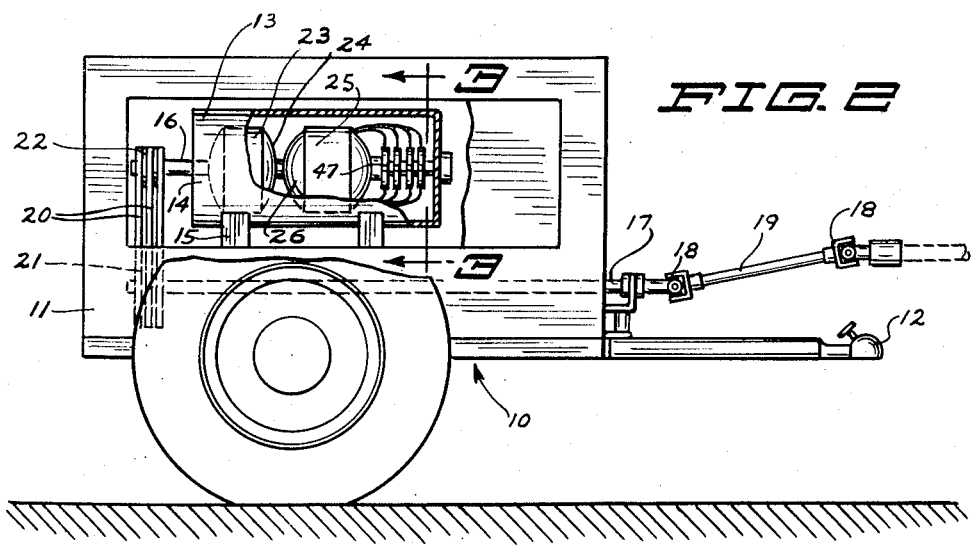
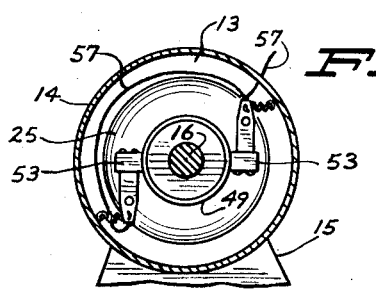
INVENTORS
GEORGE J. WASKO
BY JOE J. CHOLICK
Braddock and Braddock
ATTORNEYS Aug. 4, 1959  G. J. WASKO ET AL  2,898,542
PORTABLE GENERATOR UNIT
Filed Feb. 18, 1957  5 Sheets-Sheet 2
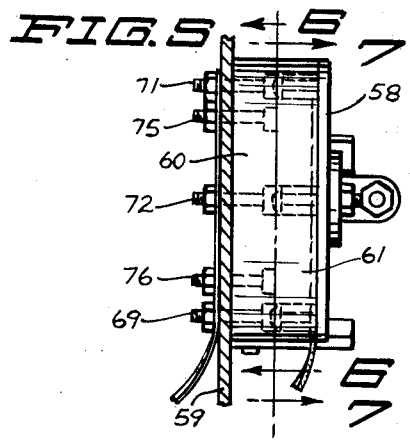
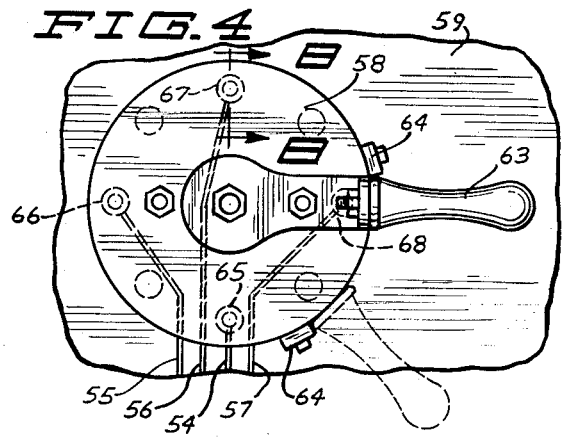
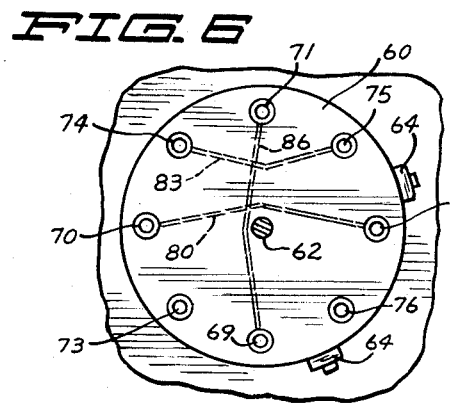
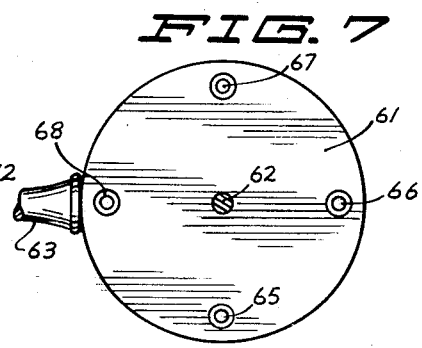
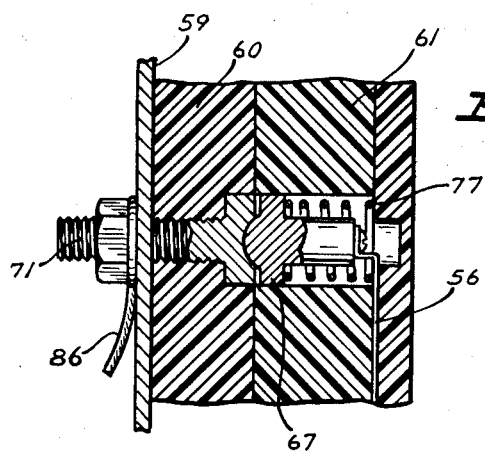
INVENTORS
GEORGE J. WASKO
BY JOE J. CHOLICK
Braddock and Braddock
ATTORNEYS INVENTORS
GEORGE J. WASKO
BY JOE J. CHOLICK
Braddock and Braddock
ATTORNEYS Aug. 4, 1959 G. J. WASKO ET AL 2,898,542
PORTABLE GENERATOR UNIT
Filed Feb. 18, 1957 5 Sheets-Sheet 4

INVENTORS
GEORGE J. WASKO
BY JOE J. CHOLICK
Braddock and Braddock
ATTORNEYS

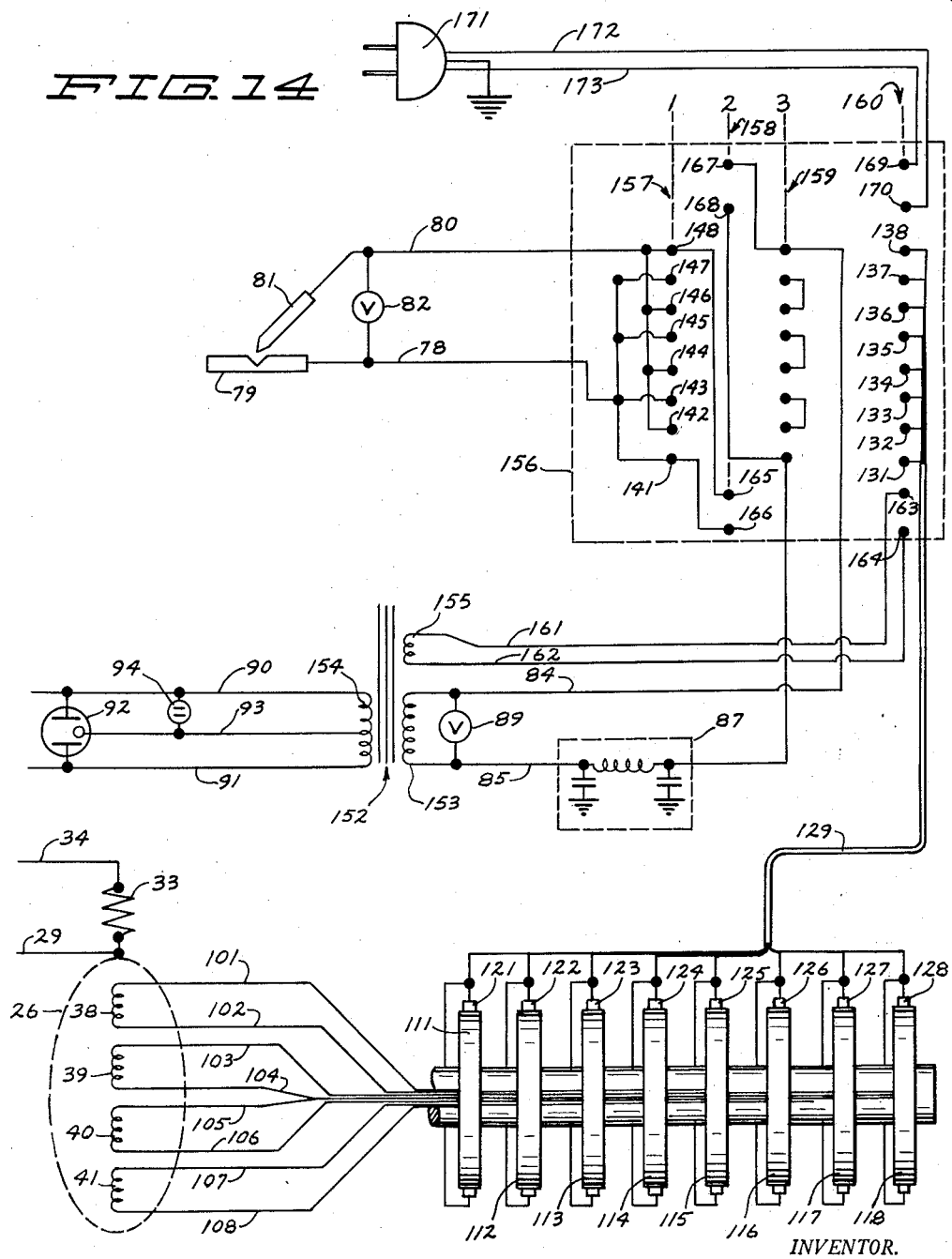

United States Patent Office 2,898,542
Patented Aug. 4, 1959

2,898,542

PORTABLE GENERATOR UNIT

George J. Wasko and Joe J. Cholick, Lakefield, Minn.

Application February 18, 1957, Serial No. 640,985

6 Claims. (Cl. 322—90)

This application is a continuation-in-part of our pending application Serial No. 555,807, for Portable Generator Unit, filed December 28, 1955, now abandoned.

This invention has relation to portable generator units and more particularly to a trailer mounted generator combination adapted to be driven from the power take-off of a tractor or from some other power source. A generator assembly of such a unit consists of a shunt wound, direct current generator mounted on the same shaft with a four pole, single phase, alternating current generator; and said generator assembly is capable of delivering direct current, alternating high voltage at relatively low current, and alternating lower voltage at relatively high current over a wide range of operating voltages.

In a device made according to the present invention the shunt wound field winding of the D.C. generator is rheostat controlled and the output of the D.C. generator is fed directly to a direct current output plug and through a switch to the field winding of the alternating current generator. This alternating current generator is of the revolving armature type with stationary field windings. The armature output of the A.C. generator is taken from the generator shaft by means of a plurality of slip rings and a switching arrangement permits connection of the armature windings in either parallel or series relationship to each other, A transformer is provided which has a first winding for receiving the output of said A.C. generator when said armature windings are connected in series with each other, and a second winding for delivering the electric energy from the first winding to a location for use thereof. This second winding may be center tapped to provide a ground connection to be used in conjunction with electrical energy being delivered at a higher voltage and to provide connections whereby electrical energy can be delivered at one half of said higher voltage.

In a practical application of the present invention, this higher voltage could be 240 volts and could be used to operate appliances or equipment designed for that voltage. The lower voltage could be 120 volts and could be used for operating lights designed to operate at that voltage.

When the switching arrangement is so constituted that when the armature windings are connected in parallel relation to each other, the resulting armature output can be fed directly to some location for use such as electric welding apparatus.

A third winding can also be provided on the transformer. This third winding can be used as an output winding to the electrical welding apparatus. Switching means can be provided whereby the first winding of the transformer can be connected across an outside source of alternating electrical energy, for example 110 volts A.C., and the third winding can be connected across the electric welding apparatus. Said apparatus can then be used to do A.C. electric arc welding utilizing power coming from the outside source and not from the A.C. generator itself. This power will also be available at the terminals of the second winding.

In the drawings,

Fig. 1 is a side elevational view of a portable generator unit made according to the present invention;

Fig. 2 is a side elevational view of said unit as seen from the opposite side from Fig. 1 with parts in section and parts broken away;

Fig. 3 is an enlarged sectional view taken on the line 3—3 in Fig. 2;

Fig. 4 is a fragmentary view of a portion of the trailer as seen in Fig. 1 showing an armature winding switch mounted on a control panel thereof;

Fig. 5 is a fragmentary view of said control panel and switch as seen from the left of Fig. 4;

Fig. 6 is a sectional view taken on the line 6—6 in Fig. 5;

Fig. 7 is a sectional view taken on the line 7—7 in Fig. 5;

Fig. 8 is an enlarged sectional view taken on the line 8—8 in Fig. 4;

Fig. 14 is a schematic representation of a portion of the electric circuit of a generator unit made according to a third form of the invention.

Figure 9:
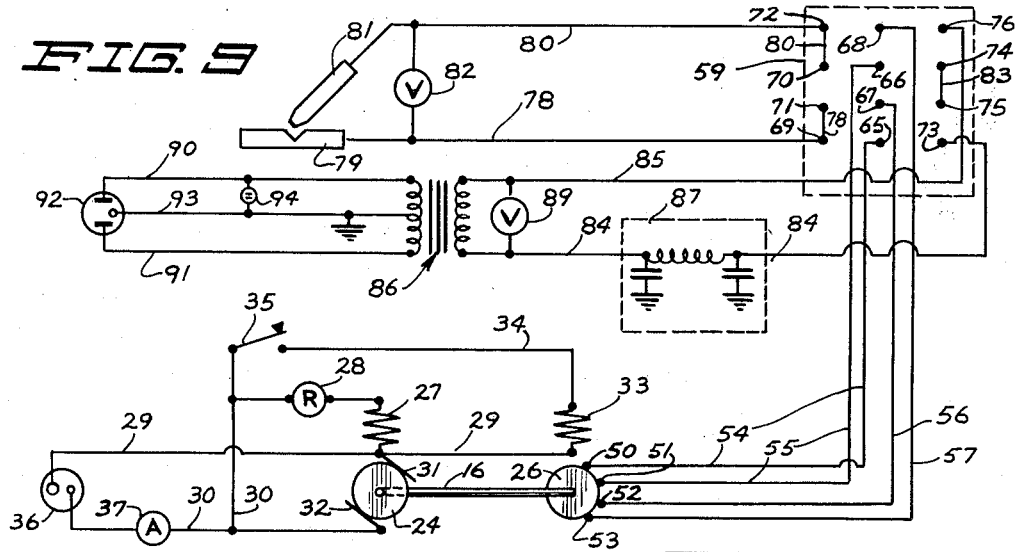
Fig. 9 is a schematic representation of the electrical circuit of the portable generator unit as disclosed in the preceding figures.
Figure 10:
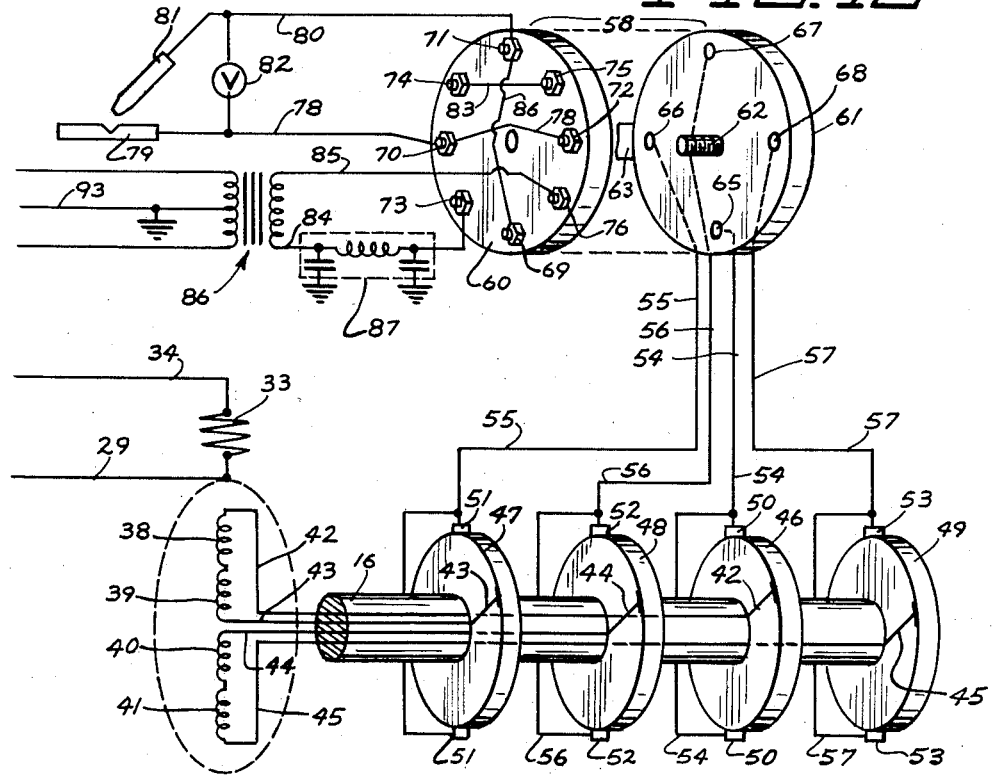
Fig. 10 is a diagrammatic representation of a portion of the circuit of Fig. 9.

Referring to the drawings and the numerals of reference thereon, a portable generator unit 10 includes a trailer 11 having a trailer hitch 12. A generator assembly 13 includes a generator assembly case 14 mounted with respect to said trailer as at 15 and a generator shaft 16 mounted in said case 14. A counter shaft 17 is rotatably mounted with respect to the trailer 11 and is adapted to be connected through the instrumentality of universal joints 18 and a connecting shaft 19 to the power take-off of a tractor or other source of power (not shown). A plurality of V-belts 20 between counter shaft pulleys 21 and generator shaft pulleys 22 operably connect the generator shaft 16 to be rotatable with the counter shaft 17.

A direct current generator 23 is mounted to have its armature 24 wound directly on generator shaft 16 and rotatable therewith. An alternating current generator 25 is positioned with its armature winding 26 wound directly on and rotatable with generator shaft 16. Field coil 27 of the direct current generator 23 and the rheostat 28 are connected in series with each other. A pair of direct current output wires 29 and 30 are connected to brushes 31 and 32 respectively. A field winding 33 of the alternating current generator 25 is connected at one side thereof to said direct current output wire 29 and at the other side thereof to a wire 34 which is connected to a switch 35. The switch 35 is connected to direct current output wire 30. Field coil 27 of the direct current generator 23 and rheostat 28 are shunt connected between said direct current output wires 29 and 30. A direct current output receptacle 36 is also connected to output wire 29 and through a direct current ammeter 37 to output wire 30.

The single phase alternating current generator 25 includes armature windings 38, 39, 40 and 41. Armature windings 38 and 39 are connected in series with each other and a wire 42 leads from an outer end of armature winding 38, along generator shaft 16 to a slip ring 46. A wire 43 leads from an outer end of armature winding 39 to slip ring 47. Windings 40 and 41 are also in series. A wire 44 leads from armature winding 40 to slip ring 48, and a wire 45 leads from armature winding 41 to a slip ring 49. This slip ring 49 and all of the other slip rings are insulated from each other and from the generator shaft 16 as best seen in Fig. 3. Two slip ring brushes 53 ride on the slip ring 49 and each of these brushes is connected to a wire 57 which extends to position outside of the generator assembly case 14. Two brushes are used to reduce the current density at the point of contact with the slip ring. Two slip ring brushes 50 on the slip ring 46 are connected to a wire 54 which extends outside of the generator assembly case 14, two slip ring brushes 51 on slip ring 47 are connected to a wire 55, and two slip ring brushes 52 on slip ring 48 are connected to a wire 56 which extends outside of the generator assembly case 14.

A wafer type armature winding switch 58 is mounted on a control panel 59 of the trailer 11 and includes a stationary wafer 60 and a rotatable wafer 61. Rotatable wafer 61 is rotatable about a pin 62 which extends through the stationary wafer 60 through the instrumentality of a switch handle 63 mounted on said rotatable wafer. Limit stops 64 on stationary wafer 60 prevent rotation of the stationary wafer 60 and the switch handle 63 through more than 45 degrees.

Rotatable wafer 61 is provided with four electrical contactors 65, 66, 67 and 68 which are connected to the wires 54, 55, 56 and 57 respectively.

Stationary wafer 60 is provided with eight electrical contactors 69, 70, 71, 72, 73, 74, 75 and 76. The construction of wafer switch 58 as indicated in Fig. 8 is typical. As indicated in this figure, electrical contactor 67 of the rotatable wafer 61 is pressed by a spring 77 in direction toward the electrical contactor 71 of the stationary wafer 60. Contactor 71 is concavely shaped at the outer end thereof to receive a convex end of contactor 67 thus assuring positive contact between these elements when they are carrying current.

When switch handle 63 is at position indicated in full lines in Fig. 4 and in Fig. 1, movable contactor 65 is in alinement with stationary contactor 69; 66 is in alinement with contactor 70; 67 with 71; and 68 with 72. When switch handle 63 and consequently rotatable wafer 61 is moved to position as seen in dotted lines in Fig. 4, movable contactor 65 is in alinement with stationary contactor 73; 66 is in alinement with 74; 67 is in alinement with 75; and 68 is in alinement with 76.

A high current output wire 78 is connected to each of the contactors 70 and 72 and extends outwardly therefrom to the frame of a piece 79 to be electrically welded (or another suitable location for use). A high current output wire 80 is connected to both contactors 69 and 71 and extends outwardly therefrom to a welding rod holder 81 (or other suitable locations for use). A voltmeter 82 is connected across these output wires 78 and 80.

Stationary electrical contactors 74 and 75 are connected to each other through the instrumentality of a jumper wire 83 while a high voltage output wire 84 is connected to stationary electrical contactor 73 and extends outwardly therefrom and a high voltage output wire 85 is connected to and extends outwardly from stationary electrical contactor 76. Output wire 85 extends to the primary of a power transformer 86 and output wire 84 extends to a pi type filter 87 which in turn is connected by an extension of the wire 84 to said primary of transformer 86. A voltmeter 89 is connected across the terminals of said primary of said transformer. Secondary output wires 90 and 91 extend from the ends of the secondary winding of the transformer 86 to a first alternating current output receptacle 92 while a grounded wire 93 extends from a center tap on said transformer 86 to said receptacle 92. Wires 90 and 93 extend also to a second alternating current output receptacle 94.

In operation, the trailer 11 of the portable generator unit 10 is hauled to its location for use and the countershaft 17 is connected to the power take-off of a tractor through the instrumentality of connecting shaft 19 and universal joints 18. Obviously the unit could be designed for operation at any of the usual generator speeds but one very satisfactory arrangement is where the countershaft is rotated to cause the generator shaft 16 to rotate at 1800 r.p.m.

In the event that the unit is to be used to supply direct current for charging batteries or other similar purposes, a suitable plug is inserted in the direct current output receptacle 36 to carry the direct current to the batteries or the like. The rheostat 28 can be adjusted to provide sufficient field strength in the field coil 27 to cause the current flowing in the output wires 29 and 30 to be the desired charging current for the batteries being charged. This current flow will be indicated on the ammeter 37.

In a device made according to the present invention, the output of the alternating current generator will be 60 cycles per second when the generator shaft 16 is rotated at 1800 r.p.m. If it is desired to make use of the portable generator unit to supply a relatively high voltage at a relatively low current, the armature winding switch 58 is positioned to have the switch handle 63 thereof located as seen in dotted lines in Fig. 4. With the parts in this position, there will be an electrical connection between the center bank and the right bank of terminals as schematically illustrated in Fig. 9 and armature windings 38, 39, 40 and 41 will all be in series with each other. A proper plug can then be inserted in the first output receptacle 92 to connect suitable wires to the secondary output wires 90 and 91 to carry this high voltage power to location for use. For example, a plug into the first output receptacle 92 can carry 220 volts to operate heavy electrical equipment.

It is to be understood that switch 35 will be closed all all of the time that useful output is being taken from the alternating current generator 25. The direct current being supplied to field winding 33 of said generator can then be varied by varying the rheostat 28 which is in series with the field coil 27 of the direct current generator 23 which supplies the field for the alternating current generator 25. The voltmeter 89 can be so calibrated that adjustment of the rheostat 28 will result in a voltage of 220 volts or any other desired voltage at the output receptacle 92.

A no-load voltage of half of that appearing at the first alternating current output receptacle 92 will appear across the second alternating current output receptacle 94. This voltage can be used to operate light electrical equipment such as lights, radios and the like. The output wires 91 and 93 could also be tapped to provide a similar voltage. Obviously this voltage between wires 91 and 93 and the voltage at the receptacle 94 can be varied by adjusting rheostat 28 as explained in the preceding paragraph.

The filter 87 in the high voltage output wire 84 makes it possible to use the output from either of the receptacles 92 or 94 to supply power for radios or for other equipment where a smooth output voltage is necessary for good and proper operation.

It is obvious that power can be taken from the first output receptacle 92, the second output receptacle 94 and from between wires 91 and 93 simultaneously. Likewise, where the loads are not varying to any great degree, power can be taken from the direct current receptacle 36 at the same time it is being taken from the alternating current receptacles.

When it is desired to obtain a relatively high alternating current at a relatively low voltage, the armature winding switch 58 is positioned as seen in Figs. 1, 4, 5 and 7. With this positioning of the parts there is a positive electrical contact between the corresponding terminals in the center bank and in the left bank of the schematic representation of the switch as seen in Fig. 9. With the parts so positioned, the armature windings 38 and 39 are connected in parallel with the armature windings 40 and 41. Since these windings were all in series connection when the generator was being used to supply relatively high voltage, it will be seen that the no-load voltage available in parallel connection will be approximately half of that of the no-load voltage in series connection. Output wires 78 and 80 can be connected to electrical welding apparatus and the rheostat 28 can again be adjusted to give the proper voltage at the work. This time the operating voltage of the electrical welding apparatus or other apparatus associated therewith will be read on the voltmeter 82.

It has been found that the current carrying and current delivering capacity of a generator made according to the present invention at the relatively low voltage available in this parallel connection is or can be extremely high. For example the device has been used to thaw frozen water pipes by the simple expedient of attaching output wire 78 to one end of the frozen pipe and output wire 80 to the other end thereof. The pipe then forms a relatively high resistance short circuit and sufficient current is caused to flow therethrough to cause the heat therefrom to melt the ice inside thereof.

When the generator unit is being utilized to provide direct current only, the switch 35 will be opened to remove the field winding 33 from the output circuit of the direct current generator 23. Also under certain conditions, with the switch 35 closed, it will be possible to utilize the output from output wires 78 and 80 to furnish alternating current while using the output receptacle 38 to provide a source of D.C. current.

Figure 11:
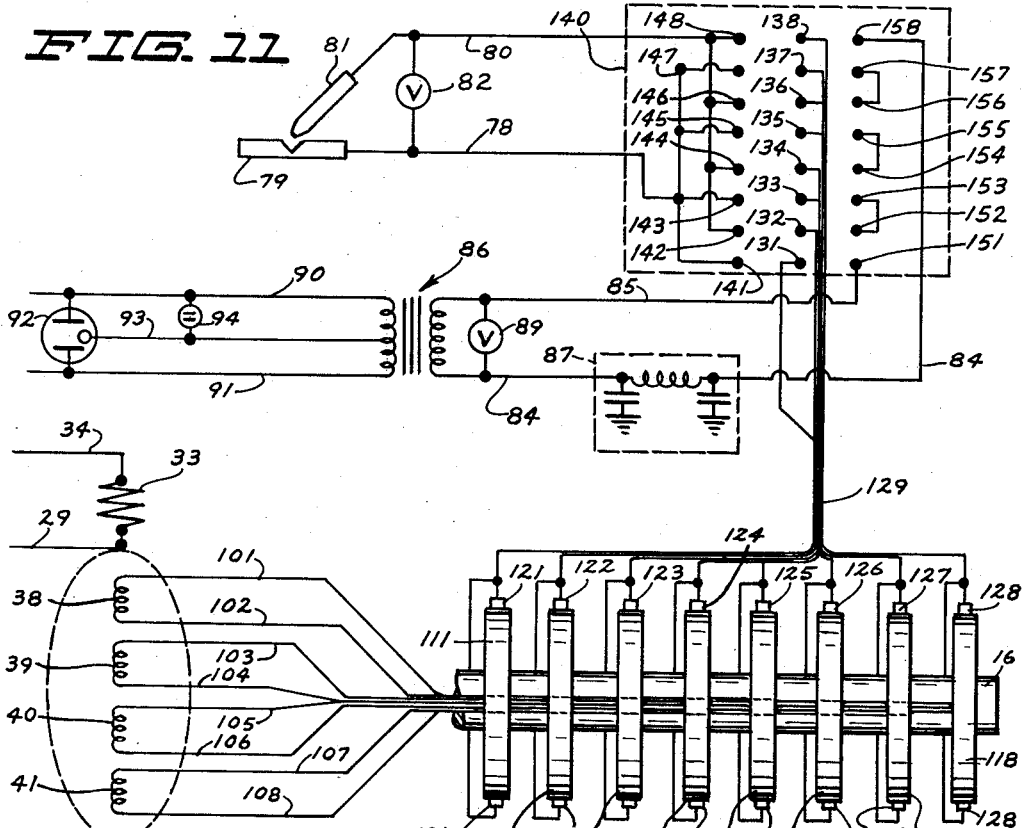
Fig. 11 is a schematic representation of a portion of the electrical circuit of a generator unit made according to a second form of the invention.
Figures 12, 13:
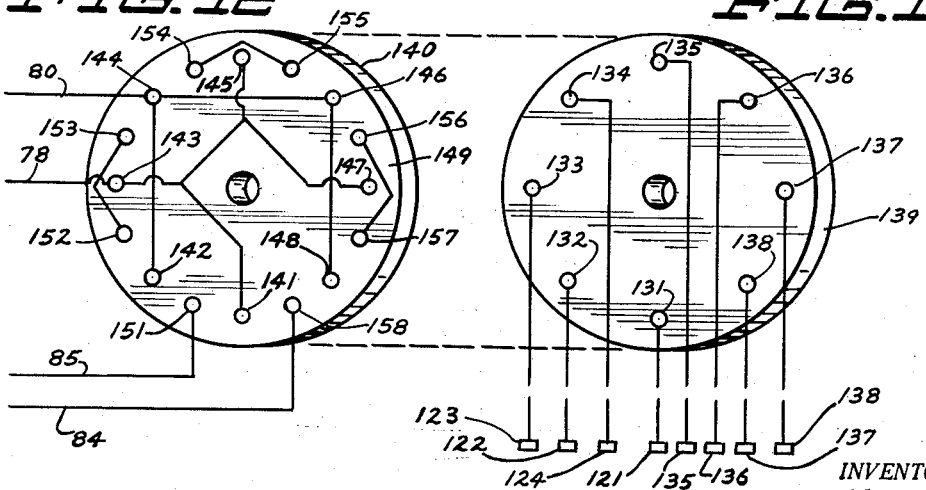
Fig. 12 is a diagrammatic representation of a first wafer of an armature winding switch for use in said second form of the invention.
Fig. 13 is a diagrammatic representation of a second wafer of the switch of Fig. 12.

In cases where it is desirable that an even higher current be obtained from the alternating current generator at an even lower voltage, this can be done without any basic change in the design of the direct current or alternating current generators. This is illustrated in Figs. 11, 12 and 13. Referring to these three figures and the numerals of reference thereon, parts thereof which are identical with the parts disclosed in the first ten figures are numbered identically with those figures.

Wires 101 and 102 extend outwardly from armature winding 38 along shaft 16 and are connected to slip rings 111 and 112 respectively; wires 103 and 104 extend from armature winding 39 to slip rings 113 and 114 respectively; wires 105 and 106 extend from armature winding 40 to slip rings 115 and 116; and wires 107 and 108 extend from armature winding 41 to slip rings 117 and 118. Slip ring brushes 121, 122, 123, 124, 125, 126, 127 and 128 are each in contact with a correspondingly numbered one of said slip rings 111 through 118 respectively and each brush is connected through one of the wires of cable 129 to a correspondingly numbered electrical contactor 131 through 138 respectively on rotatable wafer 139 of wafer type armature winding switch. Stationary electrical contactors 141 through 148 on stationary wafer 149 of the armature winding switch are situated to be in electrical contact with electrical contactors 131 through 138 respectively when said armature winding switch 140 is positioned as is armature winding switch 58 in Figs. 4, 5, 7 and 10.

With switch 140 so positioned, each of the armature windings 38, 39, 40 and 41 are connected in parallel with each other to high current output wire 80 and high current output wire 78.

With switch 140 positioned as is the dotted line representation of switch 58 in Fig. 4, a plurality of electrical contactors 151 through 158 located on stationary wafer 149 of armature winding switch 140 are in electrical contact respectively with electrical contactors 131 through 138. With the parts in this position, each of the armature winding coils 38 through 41 are connected in series with all of the others between high voltage output wires 84 and 85.

This series connection results in exactly the same circuit as was obtained by a similar positioning of the armature winding switch 58 in the first form of the invention. The parallel connection just explained, however, results in a no-load voltage equal to half of that obtained in the first form of the invention and one quarter of that obtained from the series connection in either form of the invention. It is obvious that this construction will result in making available a much higher current from the generator at a much reduced voltage.

The direct current generator 23, rheostat 28, D.C. shunt field coil 27 and A.C. field winding cut off switch 35 will be included in the circuit of Fig. 11 exactly as they were in the circuit of Fig. 9. This means that the operating voltages as indicated on voltmeters 82 and 89 will be adjustable in exactly the same way as were the voltages indicated on identically numbered voltmeters in the first form of the invention. As explained, however, the voltages which will be indicated on voltmeter 82 will be much lower in the second form of the invention than in the first.

In many situations, it will be desirable to utilize the electric welding apparatus where an outside source of alternating current is readily available and without starting up the tractor. This is provided for in a third form of the invention. Referring to Fig. 14 and the numerals of reference thereon, parts which are identical with the parts disclosed in the first 13 figures are numbered identically with those figures.

Transformer 86 of the first two forms of the invention is replaced with a transformer 152 which includes a first or primary winding 153, a second winding 154 and a third winding 155. Armature winding switches 58 and 140 are replaced by a similar switch 156 which includes a first set of stationary contactors 157, a second set of stationary contactors 158, a third set of stationary contactors 159, and a set of movable contactors 160. Said movable contactors 160 are movable to and from a first position in operational alinement with and in contact with said first set of stationary contactors 157, a second position in alinement with and in operational contact with said second set of stationary contactors 158, and a third position in alinement with and in operational contact with said third set of stationary contactors 159.

As was the case in connection with the second form of the invention, wires 101 and 102 extend outwardly from armature winding 38 along shaft 16 and are connected to slip rings 111 and 112, respectively; wires 103 and 104 extend from armature winding 39 to slip rings 113 and 114 respectively; wires 105 and 106 extend from armature winding 40 to slip rings 115 and 116; and wire 107 and 108 extend from armature winding 41 to slip rings 117 and 118. Slip ring brushes 121, 122, 123, 124, 125, 126, 127 and 128 are each in contact with a correspondingly numbered one of said slip rings 111 through 118 respectively; and each brush is connected through one of the wires of cable 129 to a correspondingly numbered electrical contactor 131 through 138 respectively which are a part of said set of movable contactors 160 of the switch 156. Stationary electrical contactors 141 through 148 are part of the first set of stationary contactors 157 in position to be in electrical contact with electrical contactors 131 through 138 respectively when said switch is positioned in said first position.

With switch 156 in said first position, each of the armature windings 38, 39, 40 and 41 are connected in parallel with each other in high current output wire 80 and high current output wire 78.

With switch 156 positioned in said third position a plurality of electrical contactors 151 through 158 located in said third set of stationary contactors 159 are in electrical contact respectively with electrical contactors 131 through 138. With the parts in this position, each of the armature winding coils 38 through 41 are connected in series with all of the others between high voltage output wires 84 and 85.

Third winding 155 of transformer 152 is connected through wires 161 and 162 respectively to electrical contactors 163 and 164 which are a part of said set of movable contactors 160. Electrical contactors 165 and 166 are part of said second set of stationary contactors 158 and are situated to be in electrical contact with contactors 163 and 164 respectively when said switch 156 is in said second position. Contactor 165 is connected to high current output wire 80; while contact 166 is connected to high current output wire 78.

High voltage output wire 84 is directly connected to an electrical contactor 167 which is a part of said second set of stationary contactors 158 and high voltage output wire 85 is electrically connected to an electrical contactor 168 which is also a part of said second set of stationary contactors 158. A pair of electrical contactors 169 and 170 are a part of said movable set of contactors 160 and are situated to be in electrical contact with said contactors 167 and 168 respectively when said switch 156 is in said second position.

An electrical inlet plug 171 is connected by wires 172 and 173 to electrical contactors 169 and 170 respectively.

When the switch 156 is in its second position, all of the armature windings are disconnected from each other and the first winding 153 of transformer 152 is connected directly across electrical inlet plug 171. This plug is connected to a source of 110 to 120 volt A.C. High current output wires 78 and 80 are connected across the third winding 155 of the transformer 152. This constitutes the transformer 152 as a step-down transformer in which the first winding 153 is serving as a primary winding and the third winding 155 is serving as a secondary winding. In this situation, the power to the wires 78 and 80 can be utilized to perform electric welding without the necessity for operating the motor generator unit and without the necessity of providing entirely separate welding equipment.

It will be obvious that power can also be taken from the second winding 154 of the transformer 152 at the output receptacle 92, the output receptacle 94, or from across wires 91 and 93 when the switch 156 is in its second condition.

What is claimed is:

1. A generator assembly including a direct current generator, a direct current output circuit including said direct current generator and a pair of direct current output terminals, an alternating current generator, an exciter circuit including said direct current generator, an exciter switch and a field winding of said alternating current generator, rheostat control means in the field of said direct current generator for varying the voltage output of said direct current generator, means for transmitting rotational movement simultaneously to a rotor of each of said direct current and alternating current generators, said alternating current generator having a plurality of armature windings, a first alternating current output circuit including a pair of alternating current output terminals and an output transformer having a first transformer winding and a second transformer winding connected to said output terminals, a second alternating current output circuit, armature winding switching means movable to and from a first position in which all of said armature windings are connected in series with each other across said first transformer winding in said output circuit and a second position in which all of said armature windings are connected in parallel with each other across said second output circuit.

2. The combination as specified in claim 1 wherein said transformer also has a third transformer winding; an input circuit adapted to be connected to a source of alternating electrical energy; and wherein said switching means is movable to and from a third position in which each of said armature windings is disconnected from every other armature winding and from said first output circuit and said second output circuit, in which said third transformer winding is connected to said second output circuit and in which said input circuit is connected to said first winding of said transformer.

3. A generator assembly including a direct current generator, a direct current output circuit including said direct current generator and a pair of direct current output terminals, an alternating current generator, an exciter circuit including said direct current generator and a field winding of said alternating current generator, rheostat control means in the field of said direct current generator for varying the voltage output of said direct current generator, means for transmitting rotational movement simultaneously to a rotor of each of said direct current and alternating current generators, said alternating current generator having a plurality of armature windings, a first alternating current output circuit including a pair of alternating current output terminals and an output transformer having first and second transformer windings thereon, a second alternating current output circuit, switching means movable to and from a first position in which all of said armature windings are connected in series with each other across said first transformer winding in said output circuit and a second position in which all of said armature windings are connected in parallel with each other across said second output circuit.

4. A generator assembly including a generator shaft, means for imparting rotational movement to said generator shaft, a direct current generator having a rotor wound on said generator shaft and having a field winding, an alternating current generator having a plurality of armature windings, a field winding and a rotor wound on said generator shaft, a pair of direct current output wires from said direct current generator to locations for use and to said alternating current generator field winding, means for varying the field current in said direct current generator field winding, a first pair of alternating current output wires, a second pair of alternating current output wires, and switching means for causing said alternating current armature windings to be connected alternatively in series with each other across said first pair of alternating current output wires and in parallel with each other across said second pair of alternating current output wires.

5. The combination as specified in claim 4 wherein said switching means includes a two position switch having first, second and third sets of electrical contactors, said first set of electrical contactors thereon being connected to one of said electrical conductors, said second set of electrical contactors being positioned to be in electrical contact with said first set of contactors when said switch is in a first position, a first half of said second set of contactors thereby becoming electrically connected to a first end of each of said alternating current armature windings, and a second half of said second set of contactors thereby becoming electrically connected to a second end of said alternating current armature windings, an electrical connection between each of the contactors of said second set of contactors associated with a first end of said alternating current armature windings and a first of said second pair of alternating current output wires, an electrical connection between each of said second set of contactors which are associated with the second end of said alternating current armature windings and a second of said second pair of alternating current output wires, said third set of contactors being positioned to be in electrical contact with each of said first set of electrical contactors when said switch is in a second position, a first electrical contactor of said third set of electrical contactors thereby becoming electrically connected with a first end of a first of said alternating current armature windings, a last of said electrical contactors of said third set of electrical contactors being electrically associated with a second end of a last of said alternating current armature windings, an electrical connection between said first contactor of said third set of contactors and a first of said first pair of alternating current output wires, an electrical connection between said last contactor of said third set of contactors and a second of said first pair of alternating current output wires, an electrical connection from each of the remaining contactors of said third set of contactors electrically connected to a first end of one of said armature windings to one of the remaining contactors of said third set of contactors electrically connected to a second end of another of said armature windings.

6. A generator assembly including an alternating current generator having a plurality of armature windings, a first alternating current output circuit including an output transformer having first, second and third transformer windings, a pair of alternating current output terminals connected to said second transformer winding, a second alternating current output circuit, an input circuit adapted to be connected to a source of alternating electrical energy, armature switching means movable to and from a first position in which all of said armature windings are connected in series with each other across said first transformer winding in said first output circuit, movable to and from a second position in which all of said armature windings are connected in parallel with each other across said second output circuit, and movable to and from a third position in which each of said armature windings is disconnected from every other armature winding and from said first output circuit and said second output circuit, in which third position said third transformer winding is connected to said second output circuit and in which third position said input circuit is connected to said first winding of said transformer.

References Cited in the file of this patent

UNITED STATES PATENTS

| | | |
|---|---|---|
| 2,117,034 | Oesterlein | May 10, 1938 |
| 2,476,373 | Hobart | July 19, 1949 |
| 2,600,643 | Hagelgantz | June 17, 1952 |